(12) United States Patent
De Rudder et al.

(10) Patent No.: US 9,180,407 B2
(45) Date of Patent: Nov. 10, 2015

(54) FLOW DEVICE FOR AN EXHAUST SYSTEM

(71) Applicant: Donaldson Company, Inc., Minneapolis, MN (US)

(72) Inventors: Korneel De Rudder, Herent (BE); Bart Schellens, Heverlee (BE); Antonio Gil, Valencia (ES); Nic Degelin, Baal (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/933,471

(22) Filed: Jul. 2, 2013

(65) Prior Publication Data

US 2014/0093439 A1  Apr. 3, 2014

Related U.S. Application Data

(63) Continuation of application No. 12/640,757, filed on Dec. 17, 2009, now Pat. No. 8,499,548.

(60) Provisional application No. 61/138,372, filed on Dec. 17, 2008.

(51) Int. Cl.
| | |
|---|---|
| *F01N 3/10* | (2006.01) |
| *B01D 53/92* | (2006.01) |
| *F01N 3/20* | (2006.01) |
| *F01N 3/28* | (2006.01) |
| *B01F 5/06* | (2006.01) |

(52) U.S. Cl.
CPC .............. *B01D 53/92* (2013.01); *B01F 5/0659* (2013.01); *F01N 3/2066* (2013.01); *F01N 3/28* (2013.01); *F01N 3/2892* (2013.01); *F01N 2240/20* (2013.01); *F01N 2470/18* (2013.01); *F01N 2470/22* (2013.01); *F01N 2610/02* (2013.01); *Y02T 10/24* (2013.01)

(58) Field of Classification Search
None
See application file for complete search history.

(56) References Cited

U.S. PATENT DOCUMENTS

| | | | |
|---|---|---|---|
| 2,561,457 | A | 7/1951 | Beales et al. |
| 2,898,202 | A | 8/1959 | Houdry et al. |
| 2,946,651 | A | 7/1960 | Houdry et al. |
| 3,048,376 | A | 8/1962 | Howald |
| 3,072,457 | A | 1/1963 | Bloch |
| 3,779,335 | A | 12/1973 | Chelminski |

(Continued)

FOREIGN PATENT DOCUMENTS

| | | |
|---|---|---|
| DE | 40 12 411 A1 | 10/1991 |
| DE | 42 03 807 A1 | 8/1993 |

(Continued)

OTHER PUBLICATIONS

International Search Report and Written Opinion mailed Mar. 16, 2010.

(Continued)

*Primary Examiner* — Jesse Bogue
(74) *Attorney, Agent, or Firm* — Merchant & Gould P.C.

(57) ABSTRACT

A flow device for an exhaust system includes a body that defines an interior cavity. An exhaust inlet passage is disposed in the interior cavity. An exhaust outlet passage is disposed in the interior cavity so that at least a portion of the exhaust inlet passage circumferentially surrounds at least a portion of the exhaust outlet passage. A doser is adapted to inject reductants into the interior cavity of the body such that the reductants are injected in the same general direction as the direction of flow of the exhaust gases.

36 Claims, 13 Drawing Sheets

(56) References Cited

U.S. PATENT DOCUMENTS

| | | |
|---|---|---|
| 3,797,240 A | 3/1974 | Inoue et al. |
| 3,835,645 A | 9/1974 | Zoleta |
| 3,863,678 A | 2/1975 | Pettersson et al. |
| 3,867,508 A | 2/1975 | Hass |
| 3,964,875 A | 6/1976 | Chang |
| 4,498,786 A | 2/1985 | Ruscheweyh |
| 4,902,487 A | 2/1990 | Cooper et al. |
| 4,916,897 A | 4/1990 | Hayashi et al. |
| 5,138,834 A | 8/1992 | Maund et al. |
| 5,272,871 A | 12/1993 | Oshima et al. |
| 5,315,824 A | 5/1994 | Takeshima |
| 5,489,153 A | 2/1996 | Berner et al. |
| 5,540,897 A | 7/1996 | Chu et al. |
| 5,601,792 A | 2/1997 | Hug et al. |
| 5,653,105 A | 8/1997 | Noirot et al. |
| 5,662,869 A | 9/1997 | Abe et al. |
| 5,693,299 A | 12/1997 | Chopin et al. |
| 5,701,735 A | 12/1997 | Kawaguchi |
| 5,772,972 A | 6/1998 | Hepburn et al. |
| 5,884,474 A | 3/1999 | Topsøe |
| 5,916,134 A | 6/1999 | Yang et al. |
| 5,941,069 A | 8/1999 | Heath |
| 5,992,141 A | 11/1999 | Berriman |
| 6,041,594 A | 3/2000 | Brenner |
| 6,050,088 A | 4/2000 | Brenner |
| 6,192,677 B1 | 2/2001 | Tost |
| 6,199,375 B1 | 3/2001 | Russell |
| 6,294,141 B1 | 9/2001 | Twigg et al. |
| 6,312,650 B1* | 11/2001 | Frederiksen et al. ......... 422/180 |
| 6,314,722 B1* | 11/2001 | Matros et al. ................... 60/274 |
| 6,401,449 B1 | 6/2002 | Hofmann |
| 6,442,933 B2 | 9/2002 | Rusch |
| 6,444,177 B1* | 9/2002 | Muller et al. .................. 422/177 |
| 6,449,947 B1 | 9/2002 | Liu et al. |
| 6,539,708 B1 | 4/2003 | Hofmann et al. |
| 6,546,717 B1 | 4/2003 | Chandler et al. |
| 6,606,854 B1 | 8/2003 | Siefker |
| 6,680,037 B1* | 1/2004 | Allansson et al. ......... 423/215.5 |
| 6,689,327 B1 | 2/2004 | Reck |
| 6,712,869 B2 | 3/2004 | Cheng |
| 6,722,123 B2 | 4/2004 | Liu |
| 6,722,124 B2 | 4/2004 | Pawson et al. |
| 6,770,252 B2 | 8/2004 | Cheng |
| 6,824,743 B1 | 11/2004 | Pawson et al. |
| 6,863,874 B1 | 3/2005 | Twigg |
| 6,889,500 B1 | 5/2005 | Martinez |
| 6,935,105 B1 | 8/2005 | Page et al. |
| 7,104,251 B2 | 9/2006 | Kim |
| 7,168,241 B2 | 1/2007 | Rudelt et al. |
| 7,351,381 B2* | 4/2008 | Ball et al. ...................... 422/170 |
| 7,448,206 B2 | 11/2008 | Meingast et al. |
| 7,482,986 B2 | 1/2009 | Wu et al. |
| 7,537,083 B2 | 5/2009 | Frederiksen |
| 7,581,389 B2 | 9/2009 | Crawley et al. |
| 7,712,305 B2 | 5/2010 | Kapsos et al. |
| 7,877,983 B2* | 2/2011 | Kunkel et al. .................. 60/286 |
| 7,896,645 B2 | 3/2011 | Loving |
| 8,015,802 B2 | 9/2011 | Nishiyama et al. |
| 8,033,104 B2 | 10/2011 | Zhang |
| 8,359,838 B2 | 1/2013 | Yamazaki et al. |
| 8,499,548 B2 | 8/2013 | De Rudder et al. |
| 2002/0053287 A1 | 5/2002 | Natarius |
| 2002/0162322 A1 | 11/2002 | Ganzmann et al. |
| 2003/0003029 A1 | 1/2003 | Rogers et al. |
| 2003/0079467 A1 | 5/2003 | Liu et al. |
| 2003/0108457 A1 | 6/2003 | Gault et al. |
| 2003/0226539 A1 | 12/2003 | Kim |
| 2004/0040782 A1* | 3/2004 | Frederiksen ................. 181/258 |
| 2004/0237511 A1 | 12/2004 | Ripper et al. |
| 2006/0218902 A1 | 10/2006 | Arellano et al. |
| 2006/0275192 A1 | 12/2006 | Gabrielsson et al. |
| 2007/0101703 A1 | 5/2007 | Kanaya et al. |
| 2007/0144158 A1 | 6/2007 | Girard |
| 2007/0189936 A1 | 8/2007 | Suwabe et al. |
| 2007/0274877 A1 | 11/2007 | Bush et al. |
| 2008/0041052 A1 | 2/2008 | Doring et al. |
| 2008/0141662 A1 | 6/2008 | Schuster et al. |
| 2008/0245060 A1 | 10/2008 | Stieglbauer |
| 2009/0000287 A1 | 1/2009 | Blaisdell et al. |
| 2009/0019843 A1 | 1/2009 | Levin et al. |
| 2009/0173063 A1 | 7/2009 | Boorse et al. |
| 2009/0205327 A1 | 8/2009 | Kabat et al. |
| 2009/0313979 A1 | 12/2009 | Kowada |
| 2009/0320726 A1 | 12/2009 | Loving |
| 2010/0101222 A1 | 4/2010 | Oesterle et al. |
| 2010/0107612 A1 | 5/2010 | Yamazaki et al. |
| 2010/0139258 A1 | 6/2010 | Hackett et al. |
| 2010/0199645 A1 | 8/2010 | Telford |
| 2010/0212292 A1 | 8/2010 | Rusch et al. |
| 2010/0212301 A1 | 8/2010 | De Rudder et al. |
| 2010/0263359 A1 | 10/2010 | Haverkamp et al. |
| 2011/0094206 A1 | 4/2011 | Liu et al. |
| 2011/0113759 A1 | 5/2011 | Tilinski et al. |
| 2011/0167810 A1 | 7/2011 | Lebas et al. |
| 2011/0219755 A1 | 9/2011 | Muller-Haas |
| 2011/0308234 A1 | 12/2011 | De Rudder et al. |

FOREIGN PATENT DOCUMENTS

| | | |
|---|---|---|
| DE | 199 55 013 A1 | 5/2001 |
| DE | 44 17 238 C2 | 3/2003 |
| DE | 10 2004 020 138 B4 | 2/2007 |
| DE | 10 2006 019 052 A1 | 10/2007 |
| DE | 10 2007 012 790 A1 | 9/2008 |
| DE | 20 2007 010 324 U1 | 1/2009 |
| DE | 10 2008 009 564 A1 | 8/2009 |
| DE | 10 2008 048 796 A1 | 3/2010 |
| DE | 10 2009 053 950 A1 | 5/2011 |
| EP | 0 470 361 A1 | 2/1992 |
| EP | 0 555 746 A1 | 8/1993 |
| EP | 0 779 415 B1 | 5/2001 |
| EP | 1 109 993 B1 | 5/2003 |
| EP | 1 054 139 B1 | 3/2004 |
| EP | 1 712 753 A2 | 10/2006 |
| EP | 1 770 253 A1 | 4/2007 |
| EP | 1 890 016 A2 | 2/2008 |
| EP | 1 712 756 B1 | 3/2009 |
| EP | 2 111 916 A1 | 10/2009 |
| EP | 2 128 398 A1 | 12/2009 |
| EP | 1 781 908 B1 | 3/2010 |
| EP | 2 204 556 A1 | 7/2010 |
| EP | 2 295 756 A1 | 3/2011 |
| EP | 2 325 448 A2 | 5/2011 |
| EP | 2 204 556 B1 | 5/2012 |
| EP | 2 465 602 A2 | 6/2012 |
| EP | 1 770 253 B1 | 9/2012 |
| EP | 2 465 602 B1 | 5/2013 |
| EP | 2 128 398 B1 | 12/2013 |
| FI | 20106317 | 12/2010 |
| FI | 20115569 | 6/2011 |
| FR | 2 384 206 | 10/1978 |
| FR | 2 861 137 A1 | 4/2005 |
| FR | 2 891 305 A1 | 3/2007 |
| GB | 2 381 218 A | 4/2003 |
| GB | 2 434 557 A | 8/2007 |
| JP | 11-166410 | 6/1999 |
| JP | 2003-193823 | 7/2003 |
| JP | 2005-155404 | 6/2005 |
| JP | 2005-273564 | 10/2005 |
| JP | 2006-105414 | 4/2006 |
| JP | 2006-205077 | 8/2006 |
| JP | 2008-128093 | 6/2008 |
| JP | 2008-274878 | 11/2008 |
| JP | 2008-309000 | 12/2008 |
| JP | 2009-150338 A | 7/2009 |
| JP | 2010-101236 | 6/2010 |
| WO | WO 97/01387 | 1/1997 |
| WO | WO 01/04466 A1 | 1/2001 |
| WO | WO 03/004839 A1 | 1/2003 |
| WO | WO 03/036056 A1 | 5/2003 |
| WO | WO 03/104624 A2 | 12/2003 |
| WO | WO 2004/033866 A1 | 4/2004 |
| WO | WO 2004/113690 A1 | 12/2004 |
| WO | WO 2006/001855 A2 | 1/2006 |

(56) References Cited

FOREIGN PATENT DOCUMENTS

| WO | WO 2006/014129 A1 | 2/2006 |
| WO | WO 2008/024535 A2 | 2/2008 |
| WO | WO 2008/144385 A2 | 11/2008 |
| WO | WO 2009/024815 A2 | 2/2009 |

OTHER PUBLICATIONS

Jungmin Seo, "Aftertreatment Package Design for SCR Performance Optimization" Apr. 12, 2011, *SAE International*, 7 pages.

Alano et al., "Compact SCR for Passenger Cars" Apr. 12, 2011, *SAE International*, 9 pages.

Akiyoshi et al., "Development of Efficient Urea-SCR Systems for EPA 2010-Compliant Medium Duty Diesel Vehicles" Apr. 12, 2011, *SAE International*, 8 pages.

Third Party Observation for application No. EP20110729001 dated Dec. 8, 2014 (5 pages).

International Search Report and Written Opinion for PCT/US2011/041493 mailed Oct. 5, 2011.

Third Party Observation for Application No. EP 20110729001 on Jan. 10, 2014.

Third Party Observation for Application No. EP 20110729001 on Jan. 15, 2014.

\* cited by examiner

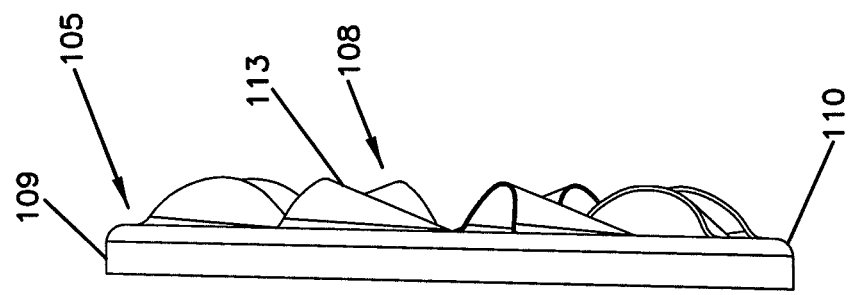
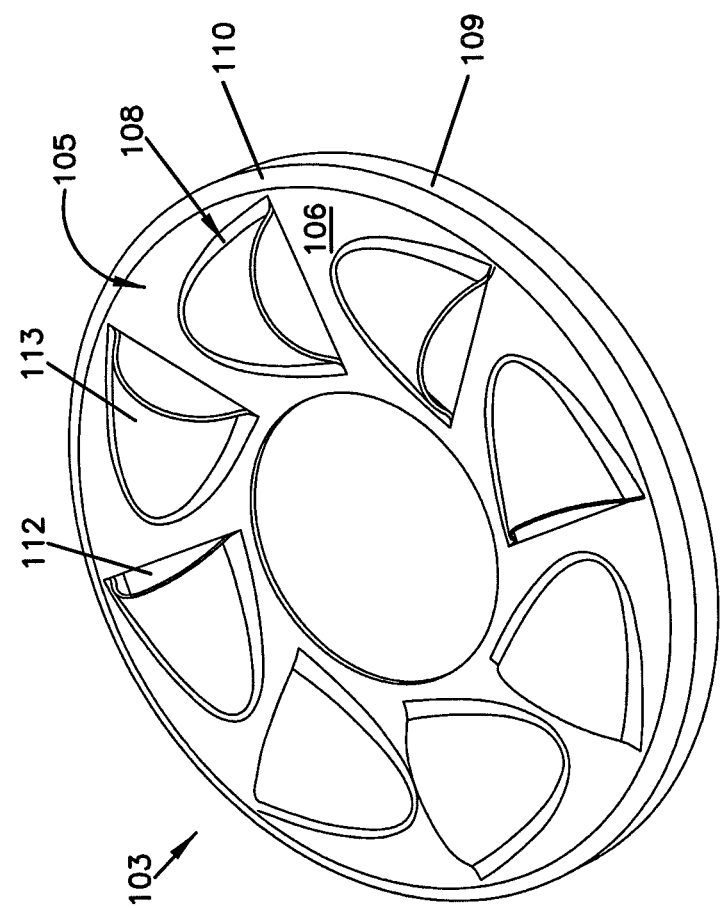

FLOW DEVICE FOR AN EXHAUST SYSTEM

CROSS-REFERENCE TO RELATED APPLICATIONS

This application is a continuation of application Ser. No. 12/640,757, filed Dec. 17, 2009, now U.S. Pat. No. 8,499,548, which claims the benefit of provisional application Ser. No. 61/138,372, filed Dec. 17, 2008, which applications are hereby incorporated by reference in their entirety.

BACKGROUND

Vehicles equipped with diesel engines typically include exhaust systems that have aftertreatment components such as selective catalytic reduction catalyst devices, lean NOx catalyst devices, or lean NOx trap devices to reduce the amount of undesirable gases, such as nitrogen oxides (NOx) in the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. However, the efficiency of the aftertreatment system depends upon how evenly the reactants are mixed with the exhaust gases. Therefore, there is a need for a flow device that provides a uniform mixture of exhaust gases and reactants.

SUMMARY

An aspect of the present disclosure relates to a flow device for an exhaust system. The flow device includes a body that includes a first axial end and an oppositely disposed second axial end. The body defines an inlet port disposed adjacent to the first axial end and an outlet port disposed adjacent to the second axial end. The body has a central longitudinal axis and defines an interior cavity. The interior cavity includes a transition space disposed adjacent to the second axial end. An exhaust outlet passage is disposed in the interior cavity. The exhaust outlet passage provides a path from the transition space to the outlet port. The exhaust outlet passage is generally aligned with the central longitudinal axis of the body. An exhaust inlet passage is disposed in the interior cavity. The exhaust inlet passage provides a path from the inlet port to the transition space and circumferentially surrounds at least a portion of the exhaust outlet passage. A doser is disposed at the second axial end of the body. The doser is adapted to inject reductants into the interior cavity of the body so that the reductants are injected in the same general direction as the direction of flow of the exhaust gases through the exhaust outlet passage. A mixer is disposed in the interior cavity adjacent to the second axial end. The mixer is adapted to swirl exhaust gases within the transition space about the central longitudinal axis of the body.

Another aspect of the present disclosure relates to an exhaust treatment system. The exhaust treatment system includes a flow device. The flow device includes a body that defines an interior cavity and includes an outer wall defining a first axial end and an oppositely disposed second axial end. The body includes an inner wall disposed in the interior cavity. The inner wall extends from the first axial end toward the second axial end. The body defines an inlet port disposed adjacent to the first axial end and an outlet port disposed adjacent to the first axial end. An exhaust outlet passage is disposed in the interior cavity. The exhaust outlet passage is defined by an inner surface of the inner wall. An exhaust inlet passage is disposed in the interior cavity. The exhaust inlet passage is defined by an outer surface of the inner wall and an inner surface of the outer wall. The exhaust inlet passage circumferentially surrounds at least a portion of the exhaust outlet passage. A first substrate is disposed in the exhaust inlet passage. A doser for injecting reductants into exhaust gases in the body is engaged to the second axial end of the body. The doser is adapted to inject reductants into the interior cavity of the body so that the reductants are injected in the same general axial direction as the direction of flow of exhaust gases through the exhaust outlet passage. The exhaust treatment system further includes an aftertreatment device disposed downstream of the flow device.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 2b is a cross-sectional view of the flow device taken on line 2b-2b of FIG. 2a.

FIG. 12 is a perspective view of a mixer suitable for use in the flow device of FIG. 8.

FIG. 13 is a side view of the mixer of FIG. 12.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
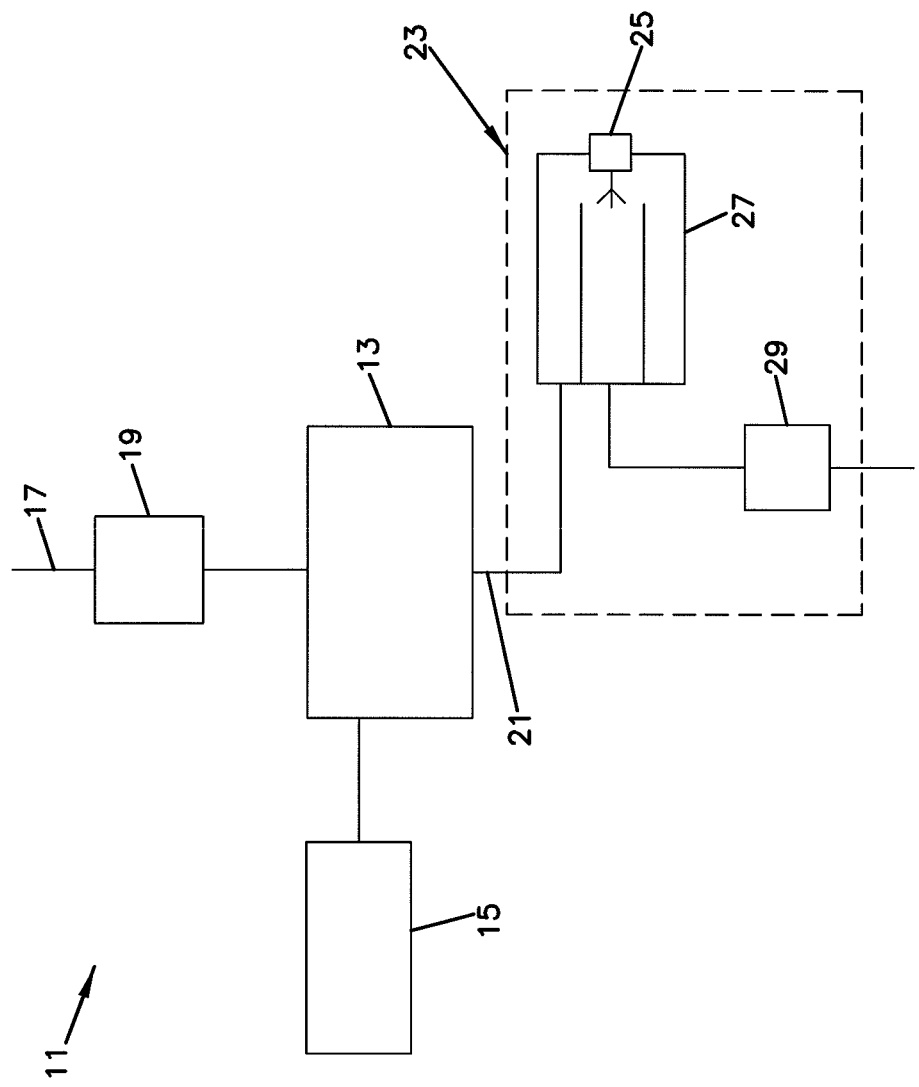
FIG. 1 is a schematic representation of an engine exhaust system having features that are examples of aspects in accordance with the principles of the present disclosure.

Referring now to FIG. 1, an engine exhaust system, generally designated 11, is shown. The engine exhaust system 11 includes an engine 13, a fuel tank 15 for supplying fuel (e.g., diesel fuel) to the engine 13, an air intake 17, an air filter 19, and an exhaust conduit 21 for conveying exhaust gas away from the engine 13. The engine exhaust system 11 also includes an exhaust treatment system, generally designated 23, which is in communication with the exhaust conduit 21. In the subject embodiment, the exhaust treatment system 23 includes a doser 25, a flow device, generally designated 27 and an aftertreatment device, generally designated 29. In the depicted embodiment of FIG. 1, the aftertreatment device 29 is disposed downstream of the flow device 27.

The aftertreatment device 29 preferably includes a structure such as a selective catalytic reduction (SCR) catalyst device, a lean NOx catalyst device, a lean NOx trap, or other device for removing pollutants from the exhaust stream. As these types of aftertreatment devices 29 are well known to those skilled in the art, the aftertreatment devices 29 will only be briefly described herein. In other embodiments, a catalytic converter, a diesel particulate filter, a flow-through filter or other type of aftertreatment device/substrate can be used as aftertreatment devices. In further embodiments, combinations of the above identified aftertreatment devices can be used.

A selective catalytic reduction (SCR) catalyst device is typically used in an exhaust system to remove undesirable gases such as nitrogen oxides (NOx) from the vehicle's emissions. SCR's are capable of converting NOx to nitrogen and oxygen in an oxygen rich environment with the assistance of reactants such as urea or ammonia, which are injected into the exhaust stream upstream of the SCR through the doser 25.

A lean NOx catalyst device is also capable of converting NOx to nitrogen and oxygen. In contrast to SCR's, lean NOx catalysts use hydrocarbons as reducing agents/reactants for conversion of NOx to nitrogen and oxygen. The hydrocarbon is injected into the exhaust stream upstream of the lean NOx catalyst. At the lean NOx catalyst, the NOx reacts with the injected hydrocarbons with the assistance of a catalyst to reduce the NOx to nitrogen and oxygen. While the exhaust treatment system 23 will be described as including an SCR, it will be understood that the scope of the present disclosure is not limited to an SCR as there are various catalyst devices that can be used in accordance with the principles of the present disclosure.

The lean NOx traps use a material such as barium oxide to absorb NOx during lean burn operating conditions. During fuel rich operations, the NOx is desorbed and converted to nitrogen and oxygen by reaction with hydrocarbons in the presence of catalysts (precious metals) within the traps.

Figure 2:
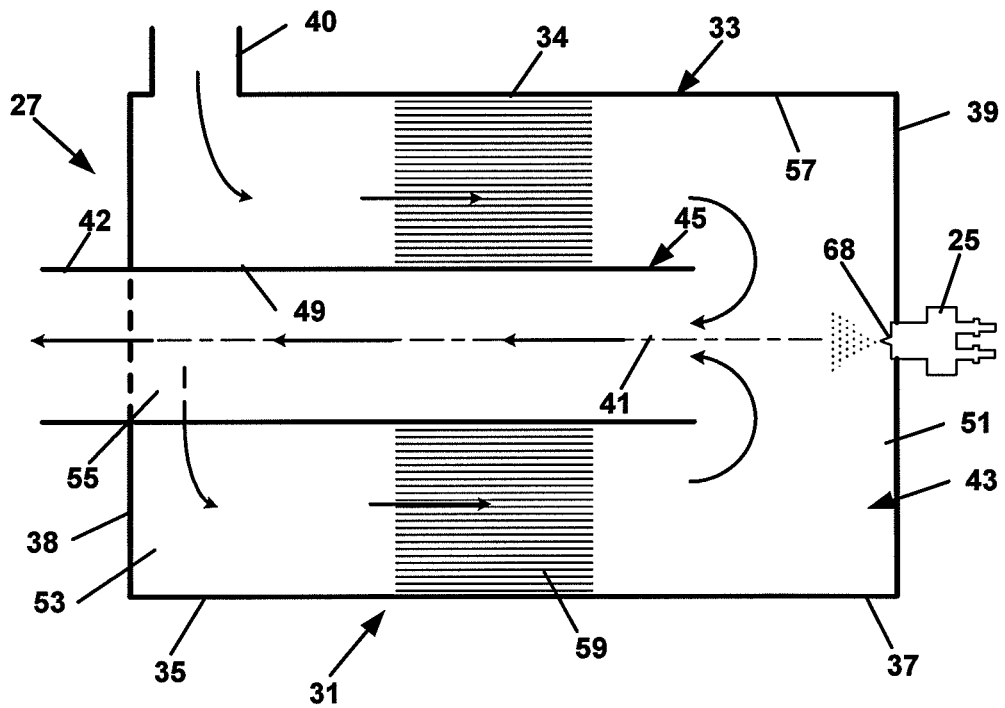
FIG. 2 is a schematic representation of a flow device suitable for use in the engine exhaust system of FIG. 1 and having features that are examples of aspects in accordance with the principles of the present disclosure.
Figure 2A:
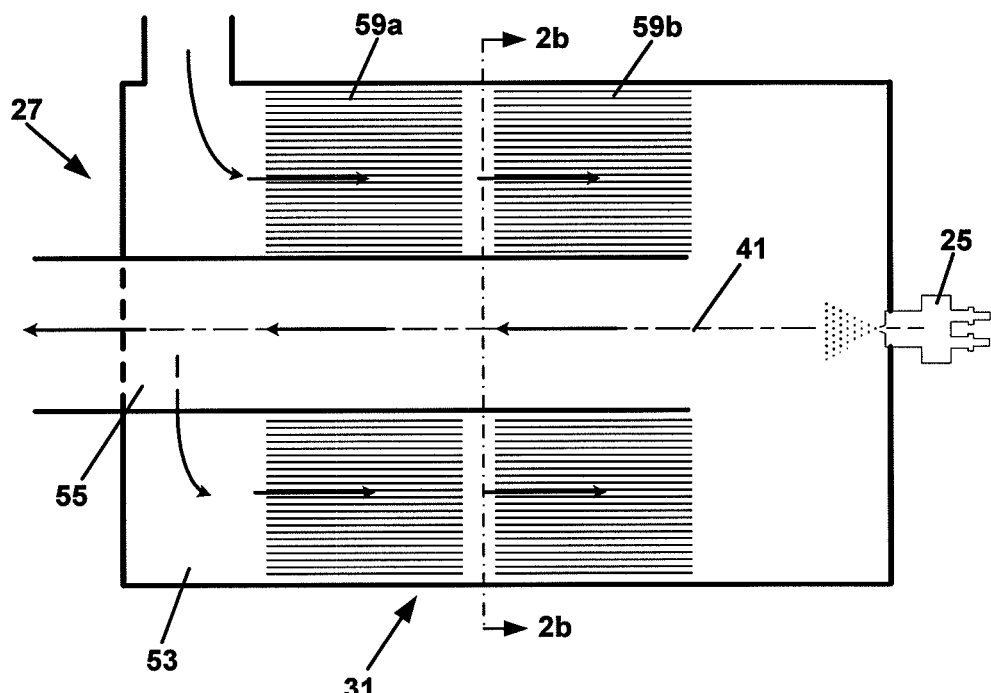
FIG. 2a is a schematic representation of the flow device of FIG. 2 having first and second substrates.
Figure 2B:
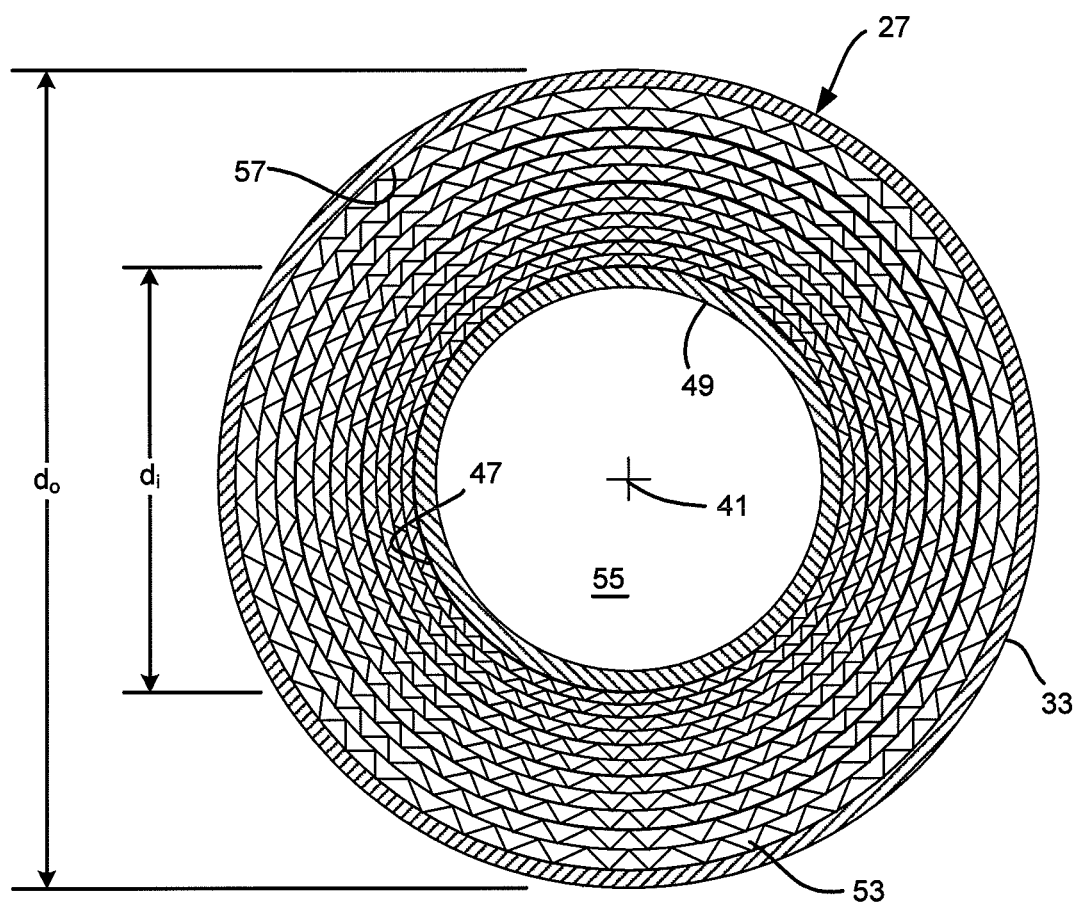

Referring now to FIGS. 2, 2a and 2b, the flow device 27 is shown. The flow device 27 includes a body, generally designated 31, having an outer wall 33 including an exterior surface 34, a first axial end 35 disposed on one end of the outer wall 33 and an oppositely disposed second axial end 37. The second axial end 37 includes an end cap 39. In the subject embodiment, the body 31 is generally cylindrical in shape and includes a central longitudinal axis 41. The first axial end 35 can be enclosed by an end cap 38 having an inlet port 40 and an outlet port 42. Each of the inlet and outlet ports 40, 42 is disposed adjacent to the first axial end 35. In the embodiment of FIG. 2, the inlet port is a side inlet port. Alternatively, FIG. 1 schematically shows an end cap 38 with an axial inlet port.

The body 31 of the flow device 27 defines an interior cavity 43 and includes an inner wall 45 disposed in the interior cavity 43. In the subject embodiment, the inner wall 45 is generally cylindrical in shape and aligned with the central longitudinal axis 41 of the body 31. The inner wall 45 includes an outer surface 47 and an inner surface 49.

In the subject embodiment, the inner wall 45 extends from the first axial end 35 of the body 31 toward the end cap 39 of the second axial end 37. In the depicted embodiment of FIG. 2, the inner wall 45 extends at least partially to the end cap 39 of the second axial end 37 such that a transition space 51 is disposed between the inner wall 45 and the end cap 39. The transition space 51 is disposed adjacent to the second axial end 37.

In the subject embodiment, the inner wall 45 separates a portion of the interior cavity 43 into an exhaust inlet passage 53 and an exhaust outlet passage 55. The exhaust inlet passage 53 is defined by an inner surface 57 of the outer wall 33 of the body 31 and the outer surface 47 of the inner wall 45 such that the exhaust inlet passage 53 is the outermost passage. The exhaust inlet passage 53 is adapted to provide a path from the inlet port 40 to the transition space 51 for exhaust gases while the exhaust outlet passage 55 is adapted to provide a path from the transition space 51 to the outlet port 42.

In the subject embodiment, the exhaust outlet passage 55 is defined by the inner surface 49 of the inner wall 45 such that the exhaust outlet passage 55 is the inner most passage. In the depicted embodiment, the exhaust inlet passage 53 and the exhaust outlet passage 55 are concentrically disposed in the body 31 such that at least a portion of the exhaust outlet passage 55 extends through at least a portion of the exhaust inlet passage 53. In the depicted embodiments of FIGS. 2, 2a and 2b, the exhaust outlet passage 55 is generally aligned with the central longitudinal axis 41 of the body 31.

The body 31 includes a substrate 59 disposed in the exhaust inlet passage 53. In one embodiment, the filtration efficiency of the substrate 59 is less than about 50%. As shown in FIGS. 2, 2a and 2b, the substrate 59 is generally ring-shaped and adapted for insertion and retention in the exhaust inlet passage 53. The substrate 59 has an outer diameter $d_o$ that generally matches the diameter of the inner surface 57 of the outer wall 33 and an inner diameter $d_i$ that generally matches the diameter defined by the outer surface 47 of the inner wall 45.

In the depicted embodiment of FIG. 2a, the body 31 includes a first substrate 59a and a second substrate 59b axially offset from the first substrate 59a. In one embodiment, the first substrate 59a is highly catalyzed while the second substrate 59b is lightly catalyzed or not catalyzed at all.

Figure 3:
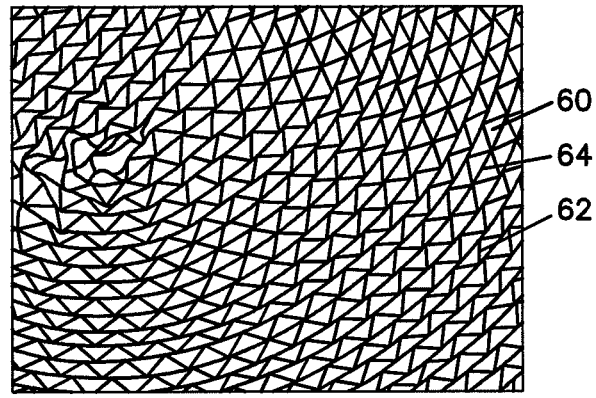
FIG. 3 is a cross-section of a substrate suitable for use in the flow device of FIG. 2.
Figure 3A:
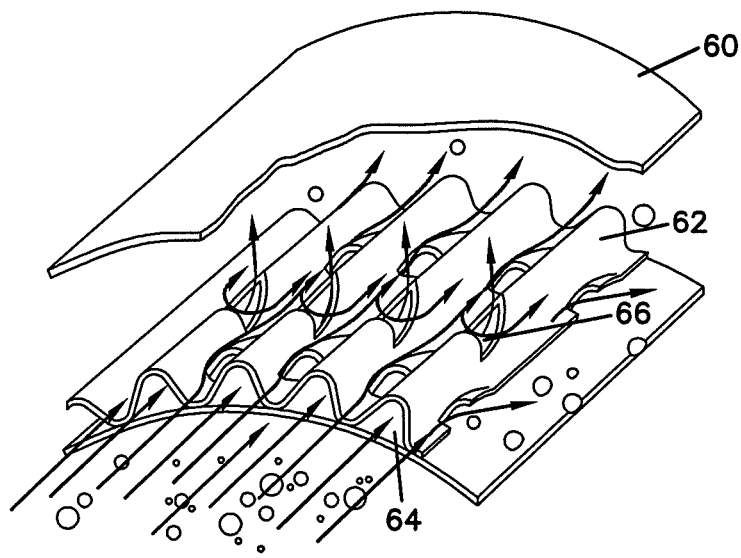
FIG. 3a is a close-up exploded view of the substrate of FIG. 3.

In the depicted embodiment of FIGS. 2b, 3 and 3a, the substrate 59 is a multi-stage filter arrangement. An exemplary substrate 59 suitable for use in the flow device 27 is described in U.S. Pat. No. 7,340,888, which is hereby incorporated by reference in its entirety. The substrate 59 can have a fabric material (e.g., a metallic fabric fleece material, etc.) 60 sandwiched between layers of corrugated metallic foil 62. A cross section of this construction is shown in FIG. 3 and a close-up exploded view is shown in FIG. 3a.

The corrugated metallic foil 62 defines elongated passageways 64 that are generally parallel to the net flow path of exhaust gases through the particulate reduction device. In operation, the exhaust gases enter through the exposed open ends of the passageways defined by the metallic foil. The metallic foil preferably contains mixing shovels 66 which direct the flow of the exhaust gases out of the passageways and into the fabric material 60. The fabric material 60 is a woven-type material constructed from metallic fibers which capture particles both by impingement and by blocking their flow. The particle-blocking properties of the fabric material 60 are determined in part by the diameter of the metallic fibers used to construct the fabric. For example, metallic fibers of 20 to 28 microns (millionths of a meter) and 35 to 45 microns have been found to work acceptably. As the exhaust gases flow out of the foil 62 and into the fabric material 60, significant internal turbulence is induced.

In the subject embodiment, the body 31 further includes the doser 25. In the subject embodiment, the doser 25 injects reductants (e.g., urea, ammonia, hydrocarbons) into exhaust gases in the flow device 27. In the depicted embodiment, the doser 25 is disposed in the end cap 39 of the body 31 and generally aligned with the central longitudinal axis 41 of the body 31 such that a nozzle/spray cone 68 of the doser 25 is adapted to direct reductants substantially into the exhaust outlet passage 55. In the subject embodiment, the reductants are injected by the doser 25 into exhaust gases in the interior cavity 43 of the flow device 27 in the same axial direction as the direction of flow of the exhaust gases.

In the depicted embodiment of FIG. 2, the nozzle/spray cone 68 is generally co-axial with the central longitudinal axis 41. In other embodiments, the doser 25 may be offset from the central longitudinal axis 41 or multiple dosers 25 can be used. In a preferred embodiment, the nozzle/spray cone 68 of the doser 25 is aimed at the center of the exhaust outlet passage 55. Thus, if the doser 25 is offset from the central longitudinal axis 41, it is preferably angled so as to spray reductants at the center of the exhaust outlet 55.

Referring now to FIGS. 1 and 2, exhaust gases (shown as arrows in FIG. 2) flow into the exhaust inlet passage 53 from the exhaust conduit 21. In the exhaust inlet passage 53, the exhaust gases pass through the multi-stage filter 59 disposed in the exhaust inlet passage 53. At the second axial end portion 37 of the body 31 of the flow device 27, the exhaust gases flow through the transition space 51 between the end cap 39 and the inner wall 45 and enter the exhaust outlet passage 55. Within the transition space 51, the exhaust gases turn/reverse direction such that exhaust gases in the exhaust inlet passage 53 flow in an opposite direction as compared to exhaust gases in the exhaust outlet passage 55. At the second axial end portion 37, the doser 25 injects reductants into the exhaust gases.

It is advantageous for the temperature of the inner wall 45 to be high in order to prevent or reduce the risk of reductants injected by the doser 25 from depositing on the inner surface 49 of the inner wall 45. The flow device 27 of the subject embodiment is potentially advantageous as at least a portion of the exhaust outlet passage 55 is surrounded by at least a portion of the exhaust inlet passage 53. The positioning of the exhaust inlet passage 53 around the exhaust outlet passage 55 maintains an elevated temperature of the inner wall 45. In another embodiment, the substrate 59 provides a layer of insulation surrounding the exhaust outlet passage 55.

Figure 4:
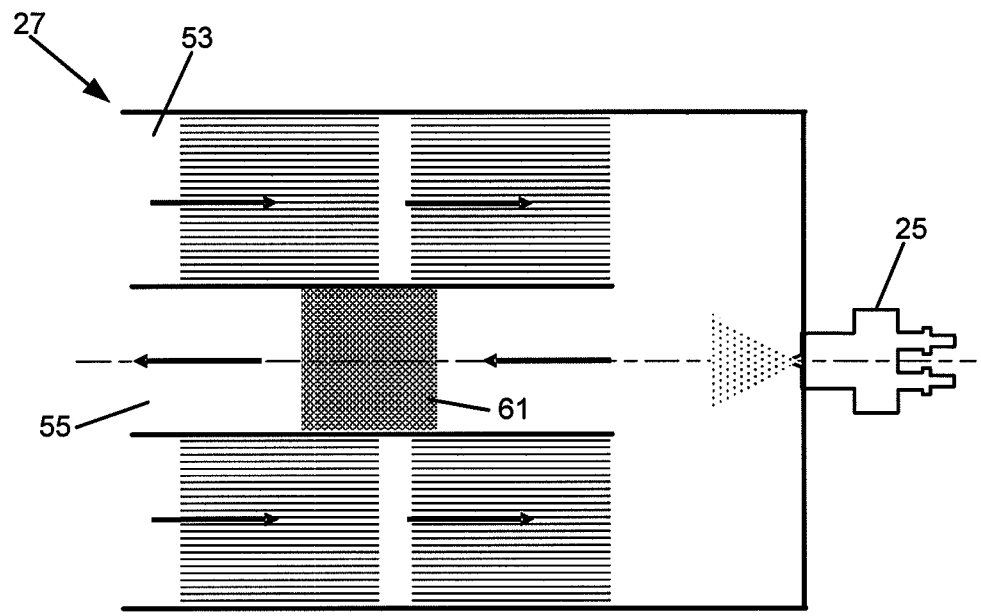
FIG. 4 is a schematic representation of an alternate embodiment of the flow device suitable for use in the engine exhaust system of FIG. 1.

Referring now to FIG. 4, an alternate embodiment of the flow device 27 is shown. In the depicted embodiment of FIG. 4, a substrate component such as a mixer 61 is disposed in the exhaust outlet passage 55. In one embodiment, the mixer 61 is an in-pipe mixer. In another embodiment, the mixer 61 is a wire mesh mixer. In another embodiment, the mixer 61 is a spark arrester type mixer. The mixer 61 is adapted to mix the reductants injected into the exhaust outlet passage 55 by the doser 25 with the exhaust gases. The mixer 61 can also be adapted to provide a hot surface for volatilizing reductants injected by the doser 25.

Figure 5:
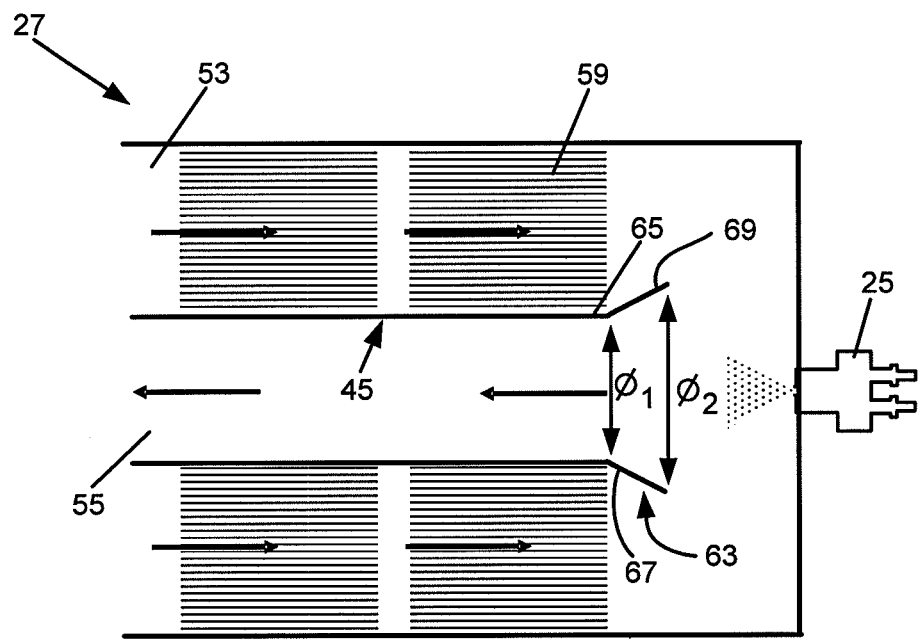
FIG. 5 is a schematic representation of an alternate embodiment of the flow device suitable for use in the engine exhaust system of FIG. 1.

Referring now to FIG. 5, an alternate embodiment of the flow device 27 is shown. In the depicted embodiment of FIG. 5, the inner wall 45 includes a flange portion, generally designated 63, disposed at an end 65 of the inner wall 45. In one embodiment, the flange portion 63 of the inner wall 45 is adapted to prevent or reduce an amount of reductants dispensed from the doser 25 from contacting the substrate 59. In another embodiment, the flange portion 63 is adapted to guide the reductants into the exhaust outlet passage 55.

The flange portion 63 is engaged with the inner wall 45. In one embodiment, the flange portion 63 is integral with the inner wall 45. The flange portion 63 includes a first end 67 and a second end 69. In the subject embodiment, the first end 67 is engaged with the end 65 of the inner wall 45. In the subject embodiment, the flange portion 63 is generally frusto-conical in shape. In the subject embodiment, the flange portion 63 includes an inner diameter $\varnothing_1$ of the first end 67 that is less than the inner diameter $\varnothing_2$ of the second end 69. The flange portion 63 defines an angle $\alpha$ as measured between the central longitudinal axis 41 and the flange portion 63. In one embodiment, the angle $\alpha$ is greater than or equal to 15 degrees. In another embodiment, the angle $\alpha$ is in the range of about 15 degrees to about 75 degrees.

Figure 6:
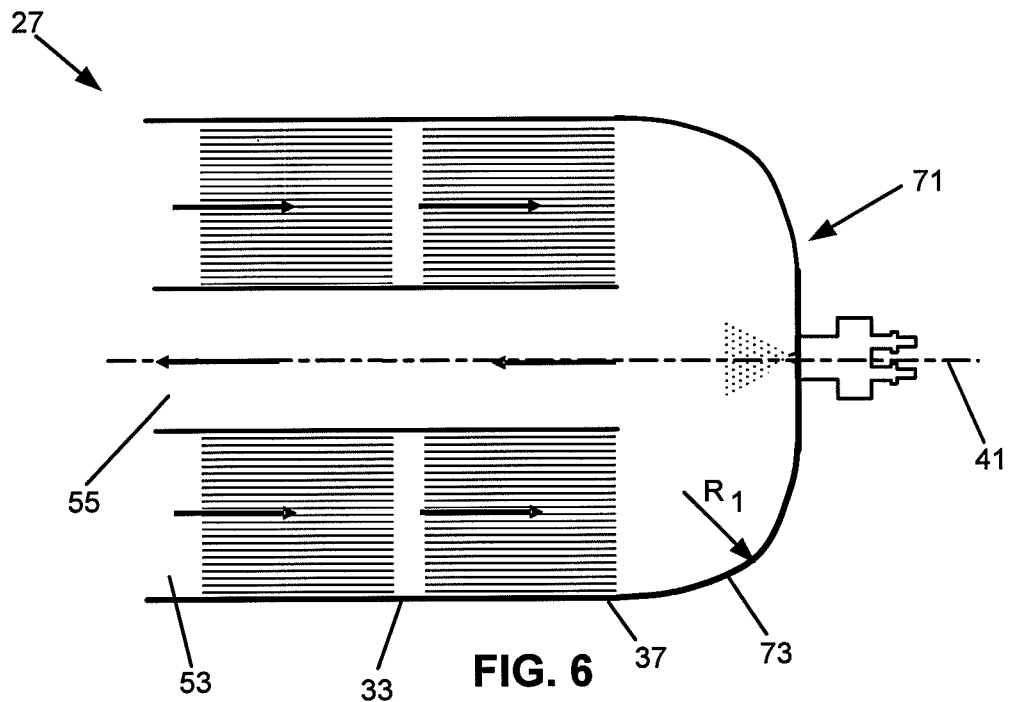
FIG. 6 is a schematic representation of an alternate embodiment of the flow device suitable for use in the engine exhaust system of FIG. 1.

Referring now to FIG. 6, an alternate embodiment of the flow device 27 is shown. In the depicted embodiment of FIG. 6, an end cap 71 is engaged to the second axial end portion 37 of the outer wall 33 of the body 31. In one embodiment, the end cap 71 is dome shaped. The end cap 71 includes a corner edge 73 defining a radius $R_1$. This radius $R_1$ gives the corner edge 73 a rounded appearance.

In the subject embodiment, the end cap 71 includes a central portion 75 that is generally flat. The central portion 75 is generally perpendicular to the central longitudinal axis 41. The doser 25 is mounted to the central portion 75 of the end cap 71 such that the doser 25 is generally aligned with the central longitudinal axis 41.

In the subject embodiment, the radius $R_1$ of the corner edge 73 of the end cap 71 is potentially advantageous as the corner edge 73 guides the exhaust gases from the exhaust inlet passage 53 to the doser 25. This guiding of the exhaust gases from the exhaust inlet passage 53 to the doser 25 potentially lowers or limits the pressure drop in the flow device 27 by reducing or eliminating dead volume in the end cap 71, where dead volume is a volume in which the exhaust gases don't readily flow. Dead volume in the end cap 71 can decrease the efficiency of the flow device 27 since reductants from the doser 25 can collect in the dead volume and thereby never mix with the exhaust gases.

Figure 7:
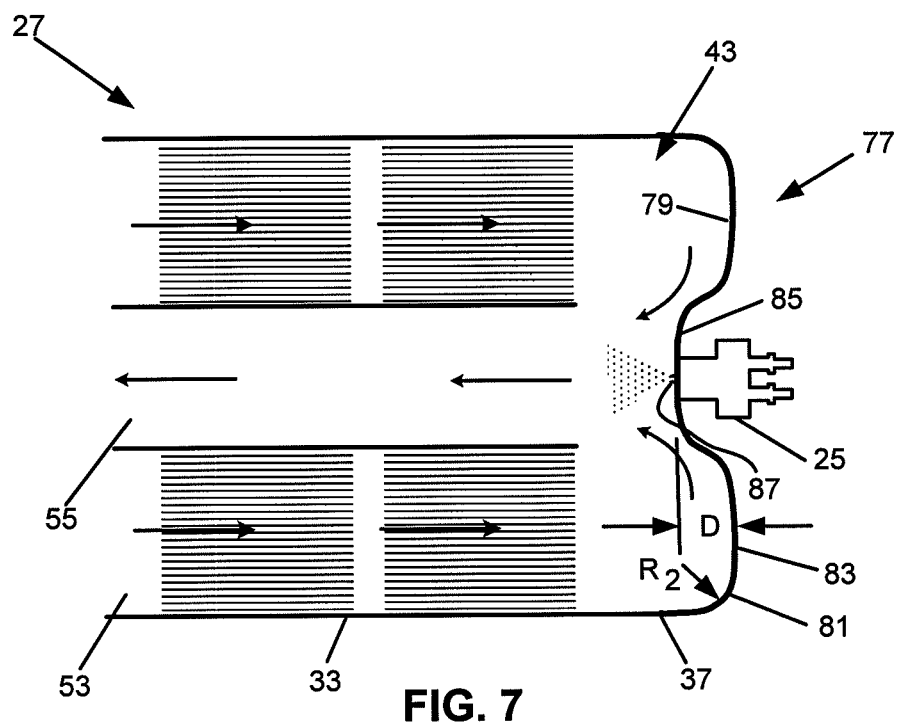
FIG. 7 is a schematic representation of an alternate embodiment of the flow device suitable for use in the engine exhaust system of FIG. 1.

Referring now to FIG. 7, an alternate embodiment of the flow device 27 is shown. In the depicted embodiment of FIG. 7, the flow device 27 includes an end cap 77 that is engaged to the second axial end portion 37 of the outer wall 33 of the body 31. The end cap 77 includes an interior surface 79 having a peripheral edge 81 defining a radius $R_2$. The radius $R_2$ functions similarly to the radius $R_1$ described above.

The end cap 77 includes an outer peripheral portion 83 and a central portion 85. In the subject embodiment, the doser 25 is mounted to the central portion 85. In the subject embodiment, the central portion 85 extends into the interior cavity 43 of the body 31 of the flow device 27 such that the central portion 85 is offset from the outer peripheral portion 83 by a distance D in a direction toward the interior cavity 43.

This offset of the central portion 85 from the outer peripheral portion 83 of the end cap 71 is potentially advantageous as the offset places the doser 25 closer to the exhaust outlet passage 55, which ensures that more reductant is sprayed into the exhaust outlet passage 55. The offset is potentially advantageous as the offset guides the flow of exhaust gases from the exhaust inlet passage 53 to the exhaust outlet passage 55. As the exhaust gases are directed toward the exhaust outlet passage 55 and away from the doser 25, the offset of the central portion 85 reduces the risk of reductant deposits forming on a nozzle 87 of the doser 25. The radius $R_2$ of the peripheral edge 83 is potentially advantageous as the radius $R_2$ can assist in efficiently turning the exhaust gases in the transition space 51 while minimizing dead space and can help carry reductant into the exhaust outlet passage 55.

Figure 8:
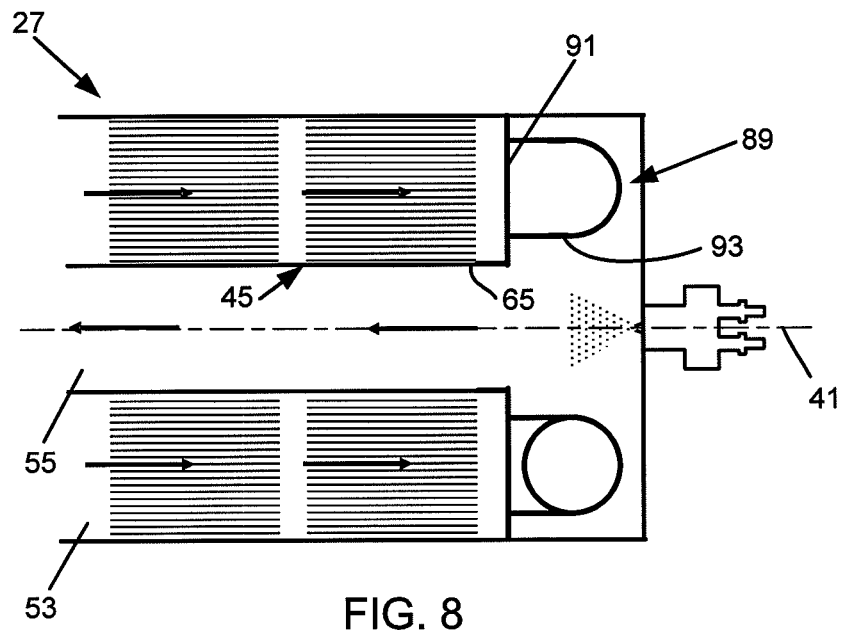
FIG. 8 is a schematic representation of an alternate embodiment of the flow device suitable for use in the engine exhaust system of FIG. 1.
Figure 9:
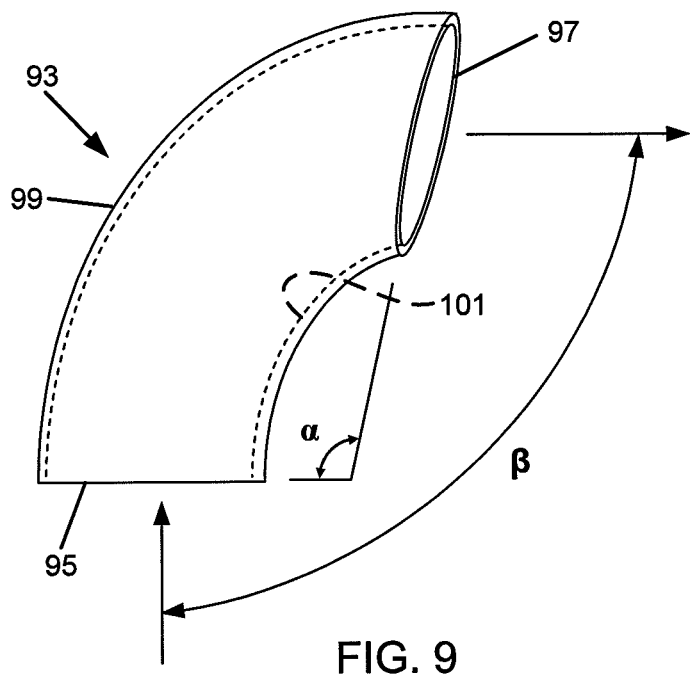
FIG. 9 is a perspective view of a flow deflector suitable for use in the flow device of FIG. 8.

Referring now to FIGS. 8 and 9, an alternate embodiment of the flow device 27 is shown. In the depicted embodiment of FIG. 8, a flow mixer 89 is engaged with the end 65 of the inner wall 45. The flow mixer 89 includes a plate 91 and a plurality of flow deflectors 93 that extend outwardly from the plate 91.

Each of the flow deflectors 93 includes a flow inlet 95, an oppositely disposed flow outlet 97, a transition portion 99, and a passage 101 (shown as a dashed line in FIG. 9) that extends through the flow deflector 93 from the flow inlet 95 to the flow outlet 97. The flow deflector 93 has an angled orientation such that the flow outlet 97 is oriented at an angle α from the flow inlet 95. The flow deflectors 93 are arranged on the plate 91 such that the flow outlets 97 of the flow deflectors 93 are directed in a first direction (e.g., a clockwise direction) about an axis of the flow mixer 89. In the subject embodiment, the axis of the mixer is generally aligned with the central longitudinal axis 41.

As the exhaust gases pass through exhaust inlet passage 53 of the flow device 27, the exhaust gases are redirected by the flow deflectors 93 of the flow mixer 89 such that the exhaust gases circulate or swirl about the central longitudinal axis 41 of the body 31. The exhaust gases are redirected in accordance with a flow redirection angle β (shown in FIG. 9) that is measured from the direction of the flow passing through the exhaust inlet passage 53 of the flow device 27. The term "flow redirection angle" as used to describe the path of the exhaust gases through the flow device 27 will be understood as being measured in accordance with the reference symbol β as shown in FIG. 9. In one embodiment, the flow redirection angle β is in the range of about 45 degrees to about 135 degrees, about 60 degrees to about 120 degrees, about 70 degrees to about 110 degrees, or about 80 degrees to about 100 degrees. In another embodiment, the flow redirection angle β is about 90 degrees. In another embodiment, the flow redirection angle β is less than or equal to about 135 degrees, less than or equal to about 120 degrees, less than or equal to about 110 degrees, less than or equal to about 100 degrees, less than or equal to about 90 degrees, less than or equal to about 80 degrees, less than or equal to about 70 degrees, less than or equal to about 60 degrees, or less than or equal to about 45 degrees.

Figure 9A:
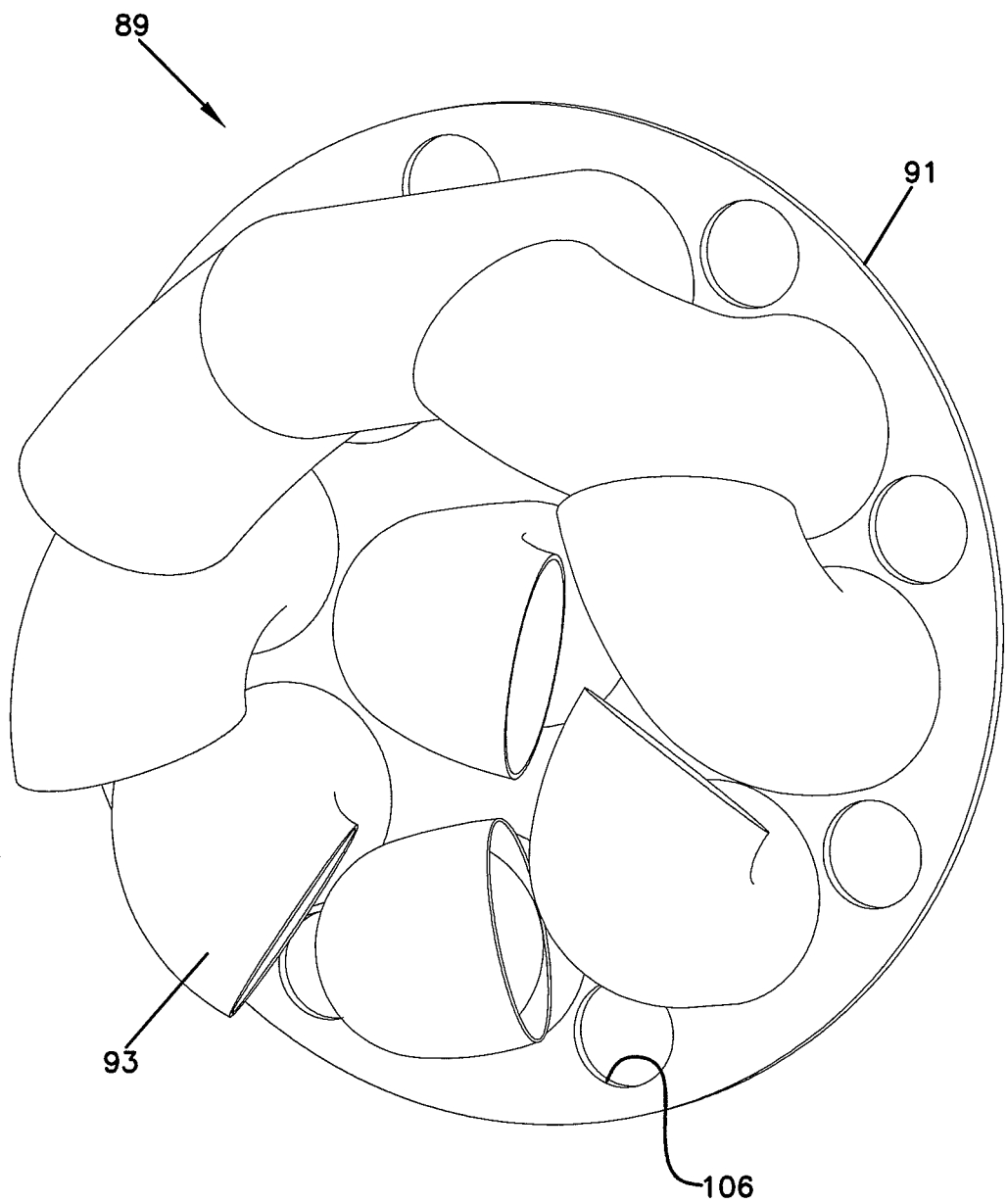
FIG. 9a is a perspective view of a mixer suitable for use in the flow device of FIG. 8.
Figure 10:
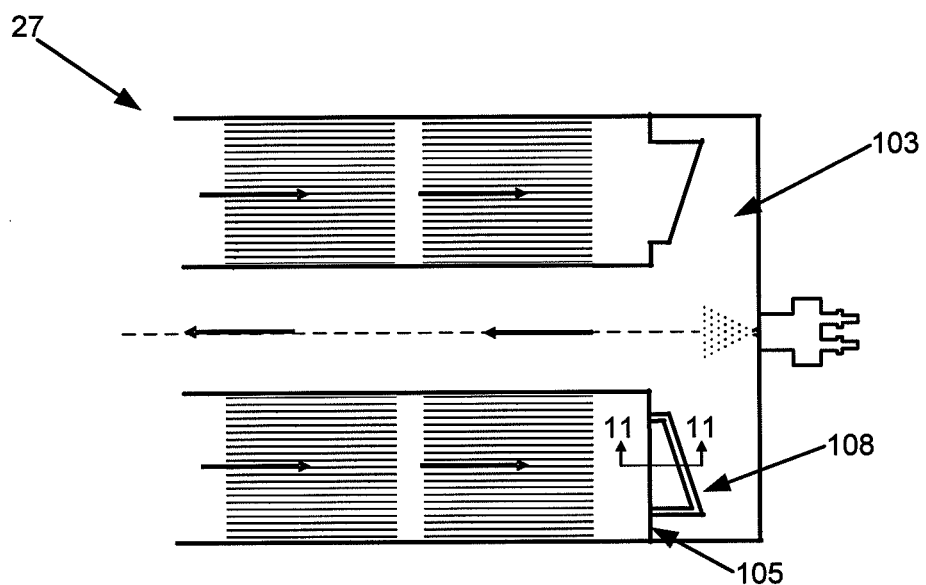
FIG. 10 is a schematic representation of an alternate embodiment of the flow device suitable for use in the engine exhaust system of FIG. 1.
Figure 11:
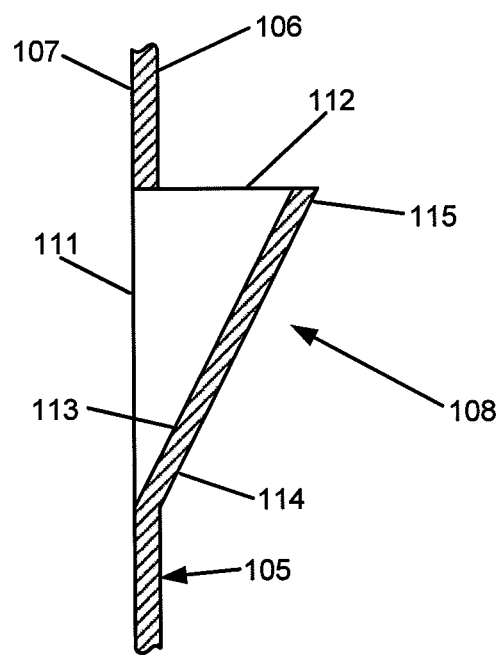
FIG. 11 is a cross-sectional view of a vent taken on line 11-11 of FIG. 10.

In the depicted embodiment of FIG. 9a, the plate 91 defines a plurality of openings 106 that extend through the plate 91. The plurality of openings 106 is not in direct communication with the flow deflection tubes 93. Rather, the plurality of openings 106 provides a direct path from the exhaust inlet passage 53 to the transition space 51. The plurality of openings 106 is potentially advantageous as the plurality of openings 106 may decrease pressure of the exhaust gases at the exhaust inlet passage side of the plate 91.

Various flow mixers that would be suitable for use with the flow device 27 have been described in U.S. patent application Ser. No. 12/120,689, which was filed on May 15, 2008 and which is hereby incorporated by reference in its entirety.

Referring now to FIGS. 10-14, an alternate embodiment of a flow mixer 103 for the flow device 27 is shown. In the subject embodiment, the flow mixer 103 includes a base plate 105, which includes a first surface 106 and an oppositely disposed second surface 107, and a plurality of vents 108 that extend outwardly from the first surface 106 of the base plate 105.

Figure 14:
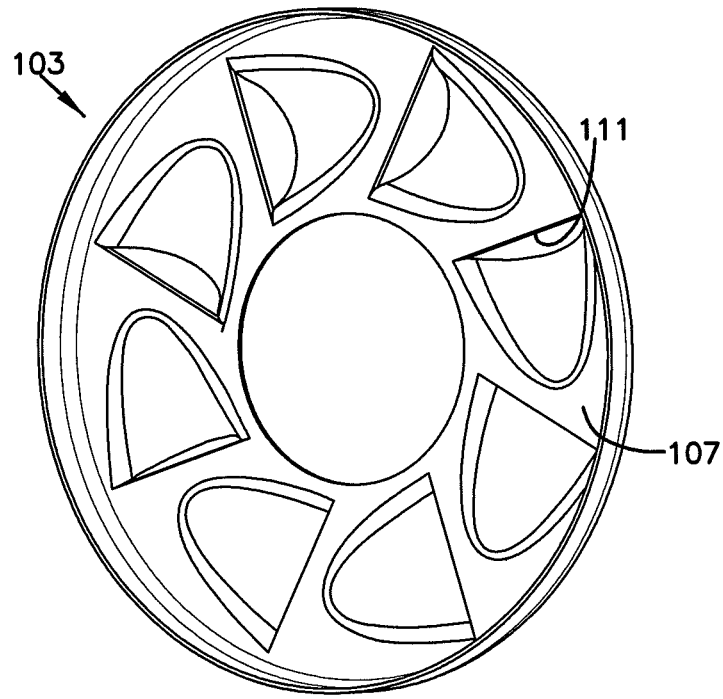
FIG. 14 is a perspective view of the mixer of FIG. 12.

In the depicted embodiments of FIGS. 12-14, the base plate 105 includes a lip 109 disposed at an outer edge 110 of the base plate 105. The lip 109 includes an outer diameter that is adapted to be received in the inner surface 57 of the outer wall 33 of the body 31. In one embodiment, the lip 109 is welded to the inner surface 57. In another embodiment, the inner surface 57 is in a press-fit engagement with the inner surface 57.

Each of the vents 108 includes a flow inlet 111 and a flow outlet 112. In the subject embodiment, the vents 108 are oriented on the base plate 105 such that the exhaust gases leaving the flow outlets 112 are generally directed in a first direction (e.g., a clockwise direction) about the central longitudinal axis 41.

Each of the vents 108 includes a deflector surface 113 that directs the exhaust gases from the flow inlet 111 to the flow outlet 112. In the subject embodiment, a first end 114 of the deflector surface 113 is in connected engagement with the base plate 105. In one embodiment, the first end 114 is integral with the base plate 105. A second end 115 defines the flow outlet 111.

In the depicted embodiment of FIG. 12, the deflector surface 113 is generally cup-shaped so that the deflector surface 113 extends outwardly from the first surface 106. As the deflector surface 113 is generally cup-shaped, the deflector surface 113 has a generally concave shape at the second surface 107 and a generally convex shape at the first surface 106.

Figure 15:
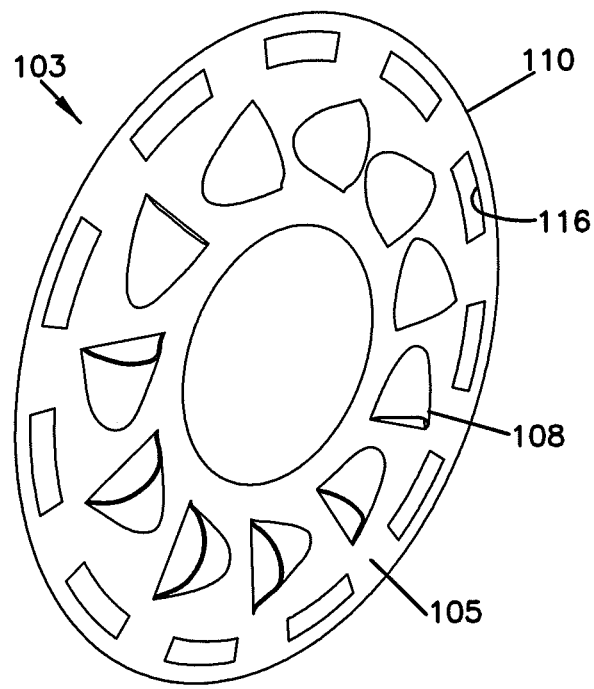
FIG. 15 is an alternate embodiment of the mixer of FIG. 12.

Referring now to FIG. 15, an alternate embodiment of the flow mixer 103 for the flow device 27 is shown. In the subject embodiment, the flow mixer 103 defines a plurality of openings 116 that extend through the base plate 105 of the flow mixer 103. In the subject embodiment, the plurality of openings 116 is arranged about the central longitudinal axis 41. In the depicted embodiment of FIG. 15, the plurality of openings 116 is disposed between the vents 108 and an outer edge 110 of the base plate 105.

Figure 16:
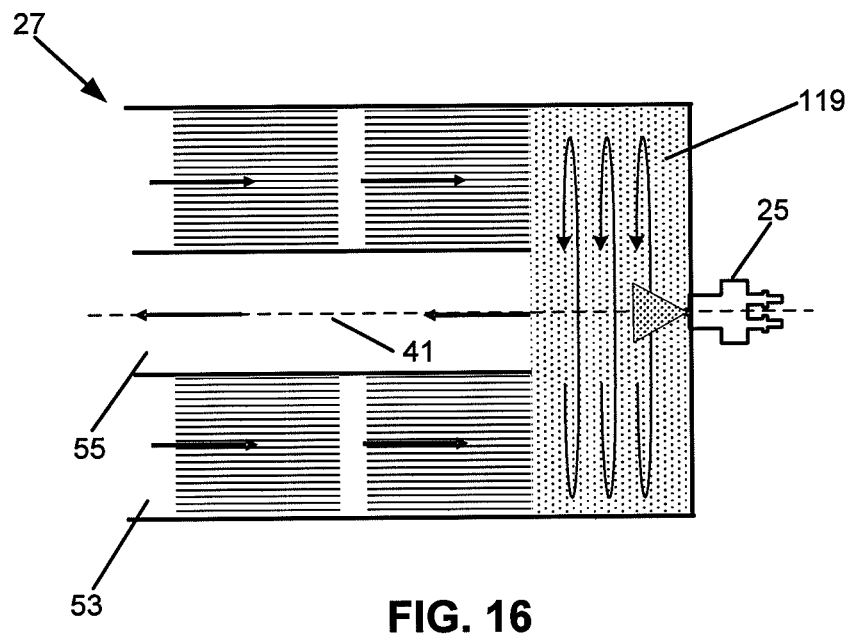
FIG. 16 is a schematic representation of an alternate embodiment of the flow device suitable for use in the engine exhaust system of FIG. 1.

Referring now to FIG. 16, an alternate embodiment of the flow device 27 is shown. In the depicted embodiment, the flow device 27 includes a mixer 119. The mixer 119 receives exhaust gases from the exhaust inlet passage 53. In the depicted embodiment, the flow direction of the exhaust gases through the exhaust inlet passage 53 is axial. Within the mixer 119, the exhaust gases are redirected such that the exhaust gases swirl about the central longitudinal axis 41 of the flow device 27. In one embodiment, the swirl of the exhaust gases is generally centrifugal.

In one embodiment, the diameter of the inlet of the mixer 119 is larger than the diameter of the outlet of the mixer 119.

This difference in diameters between the inlet and outlet of the mixer 119 creates a nozzle effect that generally increases the swirling of the exhaust gases as the exhaust gases flow from the inlet to the outlet of the mixer 119.

The doser 25 is adapted to inject reductants into the exhaust gases as the exhaust gases swirl about the central longitudinal axis 41 of the flow device 27. The exhaust gases are routed to the outlet of the mixer 119. In the subject embodiment, the outlet of the mixer 119 is aligned with the exhaust outlet passage 55.

Figure 17:
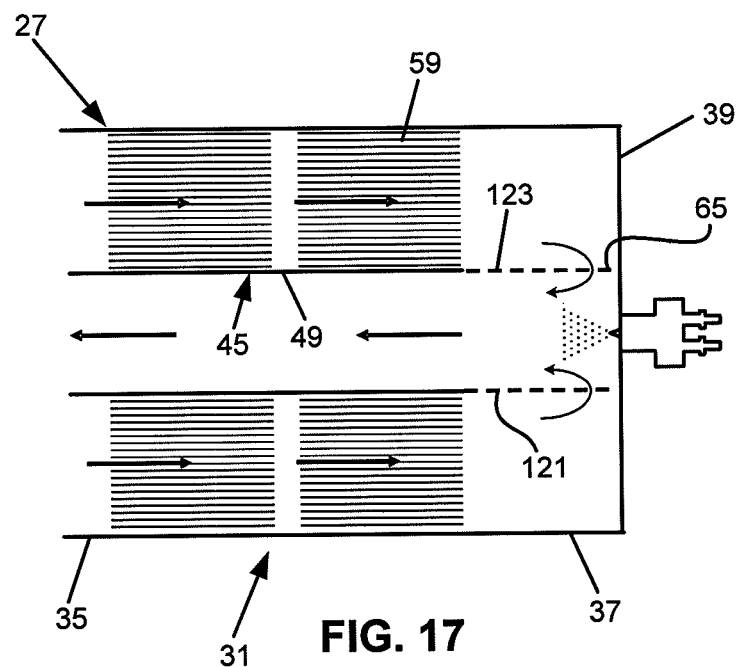
FIG. 17 is a schematic representation of an alternate embodiment of the flow device suitable for use in the engine exhaust system of FIG. 1.

Referring now to FIG. 17, an alternate embodiment of the flow device 27 is shown. The inner wall 45 extends from the first axial end portion 35 of the body 31 to the end cap 39, which is engaged with the second axial end portion 37 of the body 31. In the depicted embodiment, the end 65 of the inner wall 45 is engaged to the end cap 39.

In the subject embodiment, an axial end portion 121 of the inner wall 45 defines a plurality of openings 123. Each of the plurality of openings 123 extends through the outer and inner surfaces 47, 49 of the inner wall 45 such that each of the openings 123 form a path through which the exhaust gases can pass from the exhaust inlet passage 53 to the exhaust outlet passage 55. The openings 123 are disposed along the axial end portion 121 of the inner wall 45 at a location between the end cap 39 and the substrate 59.

In the subject embodiment, the doser 25, which is disposed on the end cap 39 and generally aligned with the central longitudinal axis 41, is circumferentially surrounded by the inner surface 49 of the inner wall 45. In this configuration, reductants are injected directly into the exhaust gases in the exhaust outlet passage 55.

Figure 18:
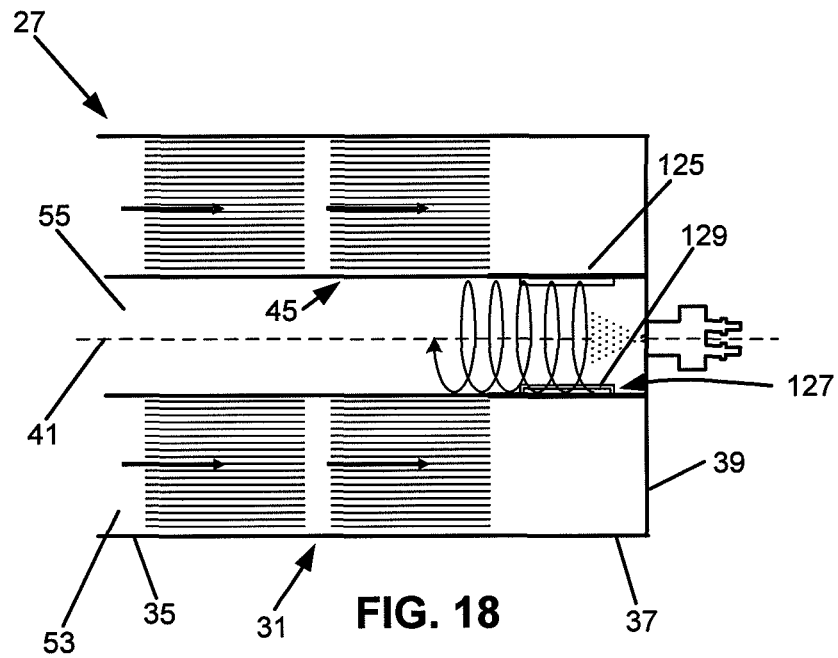
FIG. 18 is a schematic representation of an alternate embodiment of the flow device suitable for use in the engine exhaust system of FIG. 1.

Referring now to FIG. 18, an alternate embodiment of the flow device 27 is shown. In the depicted embodiment, the inner wall 45 extends from the first axial end portion 35 of the body 31 to the end cap 39, which is engaged with the second axial end portion of the body 31.

In the subject embodiment, an axial end portion 125 of the inner wall 45 defines a plurality of vents 127. Each of the vents 127 provides a pathway from the exhaust inlet passage 53 to the exhaust outlet passage 55. In one embodiment, each of the vents 127 include a deflector surface 129 that redirects the exhaust gases from the exhaust inlet passage 53 such that the exhaust gases generally swirl about the central longitudinal axis 41 in the exhaust outlet passage 55. In one embodiment, the exhaust gases generally swirl in a first direction (e.g., clockwise direction) about the central longitudinal axis 41.

In the subject embodiment, the doser 25, which is disposed on the end cap 39 and generally aligned with the central longitudinal axis 41, is circumferentially surrounded by the inner surface 49 of the inner wall 45. In this configuration, reductants are injected directly into the exhaust gases in the exhaust outlet passage 55.

Figure 19:
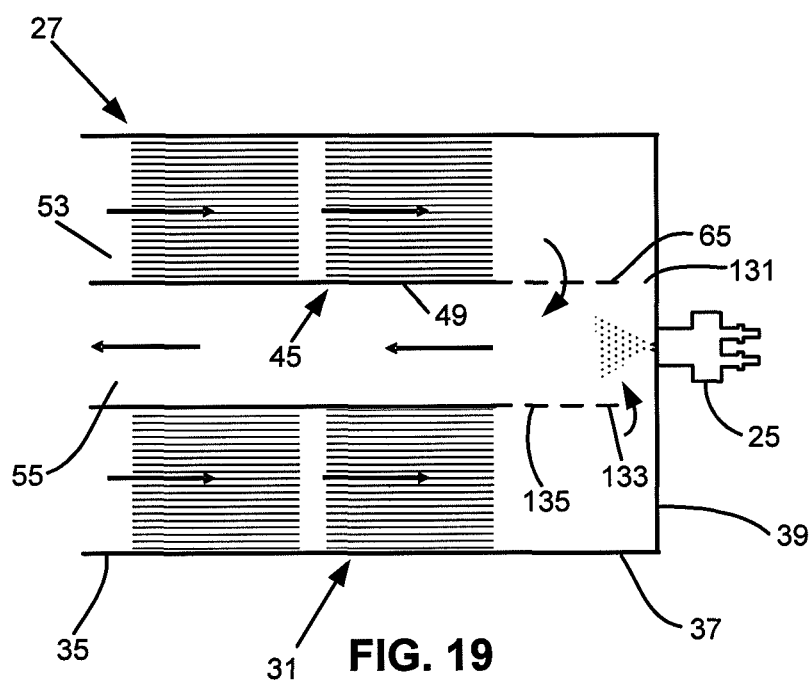
FIG. 19 is a schematic representation of an alternate embodiment of the flow device suitable for use in the engine exhaust system of FIG. 1.

Referring now to FIG. 19, an alternate embodiment of the flow device 27 is shown. In the subject embodiment, the inner wall 45 extends from the first axial end portion 35 of the body 31 toward the end cap 39 of the second axial end portion 37. In the depicted embodiment, the inner wall 45 extends at least partially to the end cap 39 of the second axial end 37 such that a gap 131 is disposed between the end 65 of the inner wall 45 and the end cap 39. In the subject embodiment, the gap 131 allows exhaust gases to flow from the exhaust inlet passage 53 to the exhaust outlet passage 55. The depicted embodiment is potentially advantageous as it may reduce deposits from forming on the doser 25.

The inner wall 45 includes an axial end portion 133 disposed adjacent to the end 65 of the inner wall 45. In the subject embodiment, the axial end portion 133 defines a plurality of openings 135 through which exhaust gases can pass from the exhaust inlet passage 53 to the exhaust outlet passage 55.

The present disclosure has provided various features of a flow device 27. It will be understood that the scope of the present disclosure includes a flow device having any one of the features described herein or any combination of any of the features described herein.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for mixing reductant in an exhaust stream using a mixing apparatus including a mixing tube defining a tube axis, the mixing apparatus also including a housing having a side wall that surrounds the tube axis and an end wall that is transverse relative to the tube axis, wherein the end wall is a first end wall, wherein the housing includes a second end wall opposite from the first end wall, wherein the side wall extends between the first and second end walls, wherein the mixing tube is straight and extends between the first and second end walls, and wherein the exhaust from the mixing tube is outletted from the housing through the second end wall, the apparatus defining a chamber defined in part by the end wall and in part by the side wall, the mixing tube having a constant diameter and having an exhaust entrance end positioned at the chamber at a location offset from the end wall, the apparatus further including a dispenser for dispensing reductant into the chamber, the dispenser being mounted to the end wall of the housing and having a dispensing end offset from the exhaust entrance end of the mixing tube in a direction toward the end wall of the housing such that an axial gap is defined within the chamber in an orientation along the tube axis between the dispensing end of the dispenser and the exhaust entrance end of the mixing tube, the reductant including ammonia or urea, the method comprising:
   supplying exhaust into the chamber;
   dispensing the reductant from the dispenser into the axial gap within the chamber;
   carrying the reductant with the exhaust from the axial gap into the exhaust entrance end of the mixing tube; and
   swirling exhaust flow about the tube axis within the mixing tube.

2. The method of claim 1, wherein the reductant is dispensed along the tube axis from the end wall toward the exhaust entrance end of the mixing tube.

3. The method of claim 2, wherein the reductant is dispensed along the tube axis by spraying the reductant along the tube axis in a direction extending from the end wall of the housing toward the exhaust entrance end of the mixing tube.

4. The method of claim 1, further comprising swirling the exhaust within the chamber before the exhaust enters the mixing tube.

5. The method of claim 4, wherein the exhaust is swirled about the tube axis within the chamber.

6. The method of claim 1, wherein the exhaust flows in a first general direction along the tube axis when entering the chamber and flows in a second general direction when exiting the chamber through the mixing tube, the first general direction being opposite from the second general direction.

7. The method of claim 1, wherein the exhaust is swirled as the exhaust enters the chamber.

8. The method of claim 1, wherein the exhaust is swirled by a swirl structure that surrounds the mixing tube.

9. The method of claim 8, wherein the swirl structure includes a plate defining a plurality of openings and flow deflection surfaces corresponding to the openings.

10. The method of claim 9, wherein the deflection surfaces include scoops.

11. The method of claim 8, wherein the swirl structure is provided at an inlet of the chamber.

12. The method of claim 8, wherein the swirl structure includes a plurality of flow deflection surfaces.

13. The method of claim 1, wherein the exhaust flows along an exterior of the mixing tube prior to entering the chamber.

14. The method of claim 1, wherein the exhaust flows through an annular space that surrounds the mixing tube prior to entering the chamber.

15. The method of claim 14, wherein the exhaust flows through a swirl structure provided at an interface between the annular space and the chamber.

16. The method of claim 1, wherein a plurality of flow deflectors are positioned circumferentially about the tube axis and are configured for swirling exhaust flow within the chamber about the tube axis.

17. A method for mixing reductant in an exhaust stream using a mixing apparatus including a mixing tube defining a tube axis, the mixing apparatus also including a housing having a main body defining a side wall that surrounds the tube axis, the main body also including oppositely positioned first and second end walls between which the side wall extends, the first and second end walls being spaced-apart from one another along the tube axis, the housing having an inlet and an outlet, the inlet including an inlet pipe, the outlet extending along the tube axis outwardly from the second end wall, the mixing tube having an end positioned adjacent to and spaced from the first end wall, the apparatus further including a dispenser for dispensing reductant into the main body of the housing in a direction toward the end of the mixing tube, the dispenser being mounted to the first end wall of the housing and having a dispensing end that is outside of an interior of the mixing tube, the reductant including urea or ammonia, the method comprising:
- supplying exhaust into the main body of the housing through the inlet pipe;
- directing at least some of the exhaust to a region within the main body that is between the dispensing end of the dispenser and the end of the mixing tube;
- dispensing the reductant from the dispenser into the region, the reductant being dispensed in a direction from the first end wall toward the end of the mixing tube;
- passing the exhaust from the region into the end of the mixing tube;
- swirling the exhaust within the mixing tube to mix the dispensed reductant with the exhaust; and
- passing the exhaust including the reductant through the outlet; and wherein the exhaust flows along an exterior of the mixing tube prior to entering the region.

18. The method of claim 17, further comprising swirling the exhaust within the region before the exhaust enters the mixing tube.

19. The method of claim 17, wherein the exhaust reverses axial flow directions within the region.

20. The method of claim 19, wherein the exhaust is swirled within the region by a swirl structure that surrounds the mixing tube.

21. The method of claim 20, wherein the swirl structure includes a plate defining a plurality of openings and flow deflection surfaces corresponding to the openings.

22. The method of claim 21, wherein the deflection surfaces include scoops.

23. The method of claim 20, wherein the swirl structure includes a plurality of flow deflection surfaces.

24. The method of claim 20, wherein the exhaust flows through an annular space that surrounds the mixing tube prior to being swirled at the region.

25. The method of claim 17, wherein the exhaust flows through an annular space that surrounds the mixing tube prior to entering the region.

26. The method of claim 17, wherein a plurality of flow deflectors are positioned circumferentially about the tube axis and are configured for swirling exhaust flow about the tube axis prior to the exhaust entering the mixing tube, the exhaust being swirled by the flow deflectors at a location within the housing adjacent to the first end wall of the main body of the housing.

27. A method for mixing reductant in an exhaust stream using a mixing apparatus including a mixing tube defining a tube axis, the mixing apparatus also including a housing having a main body defining a side wall that surrounds the tube axis, the main body also including oppositely positioned first and second end walls between which the side wall extends, the first and second end walls being spaced-apart from one another along the tube axis, the housing having an inlet and an outlet, the inlet including an inlet pipe, the outlet extending along the tube axis outwardly from the second end wall, the mixing tube having an end positioned adjacent to and spaced from the first end wall, the apparatus further including a dispenser for dispensing reductant into the main body of the housing from the first end wall toward the end of the mixing tube, the dispenser being mounted to the first end wall of the housing, the method comprising:
- supplying exhaust into the main body of the housing through the inlet pipe;
- directing the exhaust from the inlet through an annular space defined between an exterior of the mixing tube and the side wall;
- directing the exhaust from the annular space in a first general axial direction through a swirl structure and into a region within the main housing that is adjacent to the first end wall, wherein the exhaust swirls within the region;
- dispensing the reductant from the dispenser into the region, the reductant being dispensed in a direction from the first end wall toward the end of the mixing tube;
- passing the exhaust from the region into the end of the mixing tube;
- continuing swirling of the exhaust within the mixing tube to mix the dispensed reductant with the exhaust, wherein the exhaust flows in a second general axial direction within the mixing tube, the first and second general axial directions being opposite with respect to each other; and
- passing the exhaust including the reductant through the outlet.

28. The method of claim 27, wherein the swirl structure surrounds an exterior of the mixing tube.

29. The method of claim 28, wherein the swirl structure includes a plate defining a plurality of openings and flow deflection surfaces corresponding to the openings.

30. The method of claim 29, wherein the deflection surfaces include scoops.

31. The method of claim 28, wherein the swirl structure includes a plurality of flow deflection surfaces.

32. A method for mixing reductant in an exhaust stream using a mixing apparatus including a mixing tube defining a tube axis, the mixing apparatus also including a housing having a side wall that surrounds the tube axis and an end wall that is transverse relative to the tube axis, the apparatus defining a chamber defined in part by the end wall and in part by the side wall, the mixing tube having a constant diameter and having an exhaust entrance end positioned at the chamber at a location offset from the end wall, the apparatus further including a dispenser for dispensing reductant into the chamber, the dispenser being mounted to the end wall of the housing and having a dispensing end offset from the exhaust entrance end of the mixing tube in a direction toward the end wall of the housing such that an axial gap is defined within the chamber in an orientation along the tube axis between the dispensing end of the dispenser and the exhaust entrance end of the mixing tube, the reductant including ammonia or urea, the method comprising:
- supplying exhaust into the chamber;
- dispensing the reductant from the dispenser into the axial gap within the chamber;
- carrying the reductant with the exhaust from the axial gap into the exhaust entrance end of the mixing tube; and
- swirling exhaust flow about the tube axis within the mixing tube, wherein the exhaust flows in a first general direction along the tube axis when entering the chamber and flows in a second general direction when exiting the chamber through the mixing tube, the first general direction being opposite from the second general direction.

33. A method for mixing reductant in an exhaust stream using a mixing apparatus including a mixing tube defining a tube axis, the mixing apparatus also including a housing having a side wall that surrounds the tube axis and an end wall that is transverse relative to the tube axis, the apparatus defining a chamber defined in part by the end wall and in part by the side wall, the mixing tube having a constant diameter and having an exhaust entrance end positioned at the chamber at a location offset from the end wall, the apparatus further including a dispenser for dispensing reductant into the chamber, the dispenser being mounted to the end wall of the housing and having a dispensing end offset from the exhaust entrance end of the mixing tube in a direction toward the end wall of the housing such that an axial gap is defined within the chamber in an orientation along the tube axis between the dispensing end of the dispenser and the exhaust entrance end of the mixing tube, the reductant including ammonia or urea, the method comprising:
- supplying exhaust into the chamber;
- dispensing the reductant from the dispenser into the axial gap within the chamber;
- carrying the reductant with the exhaust from the axial gap into the exhaust entrance end of the mixing tube; and
- swirling exhaust flow about the tube axis within the mixing tube using a swirl structure that surrounds the mixing tube, the swirl structure including a plate defining a plurality of openings and flow deflection surfaces corresponding to the openings.

34. The method of claim 33, wherein the deflection surfaces include-scoops.

35. A method for mixing reductant in an exhaust stream using a mixing apparatus including a mixing tube defining a tube axis, the mixing apparatus also including a housing having a side wall that surrounds the tube axis and an end wall that is transverse relative to the tube axis, the apparatus defining a chamber defined in part by the end wall and in part by the side wall, the mixing tube having a constant diameter and having an exhaust entrance end positioned at the chamber at a location offset from the end wall, the apparatus further including a dispenser for dispensing reductant into the chamber, the dispenser being mounted to the end wall of the housing and having a dispensing end offset from the exhaust entrance end of the mixing tube in a direction toward the end wall of the housing such that an axial gap is defined within the chamber in an orientation along the tube axis between the dispensing end of the dispenser and the exhaust entrance end of the mixing tube, the reductant including ammonia or urea, the method comprising:
- supplying exhaust into the chamber, wherein the exhaust flows along an exterior of the mixing tube prior to entering the chamber;
- dispensing the reductant from the dispenser into the axial gap within the chamber;
- carrying the reductant with the exhaust from the axial gap into the exhaust entrance end of the mixing tube; and
- swirling exhaust flow about the tube axis within the mixing tube.

36. A method for mixing reductant in an exhaust stream using a mixing apparatus including a mixing tube defining a tube axis, the mixing apparatus also including a housing having a side wall that surrounds the tube axis and an end wall that is transverse relative to the tube axis, the apparatus defining a chamber defined in part by the end wall and in part by the side wall, the mixing tube having a constant diameter and having an exhaust entrance end positioned at the chamber at a location offset from the end wall, the apparatus further including a dispenser for dispensing reductant into the chamber, the dispenser being mounted to the end wall of the housing and having a dispensing end offset from the exhaust entrance end of the mixing tube in a direction toward the end wall of the housing such that an axial gap is defined within the chamber in an orientation along the tube axis between the dispensing end of the dispenser and the exhaust entrance end of the mixing tube, the reductant including ammonia or urea, the method comprising:
- supplying exhaust into the chamber, wherein the exhaust flows through an annular space that surrounds the mixing tube prior to entering the chamber;
- dispensing the reductant from the dispenser into the axial gap within the chamber;
- carrying the reductant with the exhaust from the axial gap into the exhaust entrance end of the mixing tube; and
- swirling exhaust flow about the tube axis within the mixing tube.

* * * * *